United States Patent
Cho et al.

(10) Patent No.: US 9,465,479 B2
(45) Date of Patent: Oct. 11, 2016

(54) MOBILE TERMINAL AND IMAGE CONVERTING METHOD THEREOF

(71) Applicant: LG ELECTRONICS INC., Seoul (KR)

(72) Inventors: Beomseok Cho, Seoul (KR); Jaephil Ki, Seoul (KR); Hoonsang Yun, Seoul (KR); Chanseok Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/821,929

(22) Filed: Aug. 10, 2015

(65) Prior Publication Data

US 2015/0346901 A1    Dec. 3, 2015

Related U.S. Application Data

(63) Continuation of application No. 13/593,993, filed on Aug. 24, 2012, now Pat. No. 9,128,599.

(30) Foreign Application Priority Data

Aug. 29, 2011    (KR) .................. 10-2011-0086756

(51) Int. Cl.
| | | |
|---|---|---|
| *G06F 3/041* | (2006.01) | |
| *H04N 13/04* | (2006.01) | |
| *G06F 3/0486* | (2013.01) | |
| *G06F 3/0488* | (2013.01) | |
| *G06F 3/01* | (2006.01) | |

(52) U.S. Cl.
CPC ............. *G06F 3/0416* (2013.01); *G06F 3/017* (2013.01); *G06F 3/0412* (2013.01); *G06F 3/0486* (2013.01); *G06F 3/0488* (2013.01); *H04N 13/0456* (2013.01); *G06F 2203/04104* (2013.01); *G06F 2203/04808* (2013.01)

(58) Field of Classification Search
CPC .... G06F 3/0416; G06F 3/017; G06F 3/0486; G06F 3/0412; G06F 3/0488; G06F 2203/04104; G06F 2203/04808; H04N 13/0456
See application file for complete search history.

(56) References Cited

U.S. PATENT DOCUMENTS

| | | | | |
|---|---|---|---|---|
| 2010/0225662 A1* | 9/2010 | Nakayama | ............ | G06F 3/0488 345/589 |
| 2011/0164029 A1* | 7/2011 | King | ............... | G06F 3/04883 345/419 |
| 2012/0062549 A1* | 3/2012 | Woo | ................ | G06F 3/04815 345/419 |
| 2012/0144347 A1* | 6/2012 | Jo | .................. | G06F 3/04883 715/863 |

OTHER PUBLICATIONS

U.S. Office Action dated Jul. 24, 2014 issued in co-pending U.S. Appl. No. 13/593,993.
U.S. Final Office Action dated Jan. 15, 2015 issued in co-pending U.S. Appl. No. 13/593,993.
U.S. Notice of Allowance dated Apr. 24, 2015 issued in co-pending U.S. Appl. No. 13/593,993.

* cited by examiner

*Primary Examiner* — Andrew Sasinowski
(74) *Attorney, Agent, or Firm* — KED & Associates LLP

(57) ABSTRACT

An image converting method for a mobile terminal may include displaying a first image on a display unit, designating a partial area (or object) of the first image in response to a touch input, and outputting the designated partial area into a second image having a different stereoscopic type from the first image.

21 Claims, 15 Drawing Sheets

MOBILE TERMINAL AND IMAGE CONVERTING METHOD THEREOF

CROSS-REFERENCE TO RELATED APPLICATIONS

This present application is a continuation application of U.S. patent application Ser. No. 13/593,993 filed on Aug. 24, 2012, which claims priority under 35 U.S.C. §119 to Korean Application No. 10-2011-0086756, filed Aug. 29, 2011, the subject matter of which is incorporated herein by reference.

BACKGROUND

1. Field

This disclosure relates to a mobile terminal. This disclosure also relates to a mobile terminal capable of converting part of a two-dimensional image into a perceived three-dimensional (3D) image using a touch gesture.

2. Background

Mobile terminals may be configured to perform various functions such as data and voice communication, capturing images or video, storing voice, reproducing music files via a speaker system, displaying images or video and/or the like. Mobile terminals may include an additional function of playing games. Mobile terminals may be implemented as multimedia players. Mobile terminals may receive broadcast or multicast signals to allow viewing of video or television programs.

Efforts are undergoing to support or enhance various functions of such mobile terminals. Such efforts include not only changes and improvement of structural components implementing a mobile terminal, but also software or hardware improvement.

A touch function of the mobile terminal may use a touch screen to conveniently execute operations of the mobile terminal. The touch function is an important function of the mobile terminal together with a user interface (UI), in addition to a simple input function.

A mobile terminal may display a stereoscopic three-dimensional (3D) image enabling depth perception and stereovision beyond a level of displaying a two-dimensional (2D) image. Therefore, in addition to movie and TV, a mobile terminal may also fabricate contents with 3D images.

In order to display a stereoscopic 3D image in a mobile terminal, the corresponding image (content) should support 3D. If a predetermined image (content) does not support 3D, the image may be simply displayed in a 2D form (form). When the predetermined image supports 3D, a user may view a 2D image by converting a display mode into a 2D mode.

However, in a stereoscopic image displaying method, the user may merely selectively view a 2D image or a 3D image by specifically selecting a 2D mode or a 3D mode.

BRIEF DESCRIPTION OF THE DRAWINGS

Arrangements and embodiments may be described in detail with reference to the following drawings in which like reference numerals refer to like elements and wherein.

DETAILED DESCRIPTION

Description may be provided in detail of preferred configurations of mobile terminals, with reference to the accompanying drawings. Hereinafter, suffixes "module" and "unit or portion" for components used herein in description may be merely provided only for facilitation of preparing this specification, and thus may not be granted a specific meaning or function. It should be noticed that "module" and "unit or portion" may be used together.

Mobile terminals may be implemented using a variety of different types of terminals. Examples of such terminals include mobile terminals, such as mobile phones, smart phones, notebook computers, digital broadcast terminals, Personal Digital Assistants (PDA), Portable Multimedia Players (PMP), navigators and the like, and stationary terminals, such as digital TVs, desktop computers and the like. The following description assumes that the terminal is a mobile terminal. However, it may be easily understood by those skilled in the art that the configuration according to the following description may be applied to the stationary terminals except for components particularly provided for mobility.

In disadvantageous arrangement, the user may unable to designate a part of the 2D image and watch the designated part in a 3D form, or to designate a part of the 3D image and watch the designated part in a 2D form. Therefore, even if the user desires to view a partial area (object) included in a displayed image in a 3D form, the user should convert the entire image from the 2D form into the 3D form. Accordingly, the user's various demands may not be satisfied. This may also cause unnecessary power consumption due to converting an unnecessary portion into the 3D form.

Embodiments may attempt to avoid these problems. Therefore, an aspect of the detailed description may be to provide a mobile terminal capable of designating a part of a predetermined image and converting the designated part into another type of image.

Figure 1:
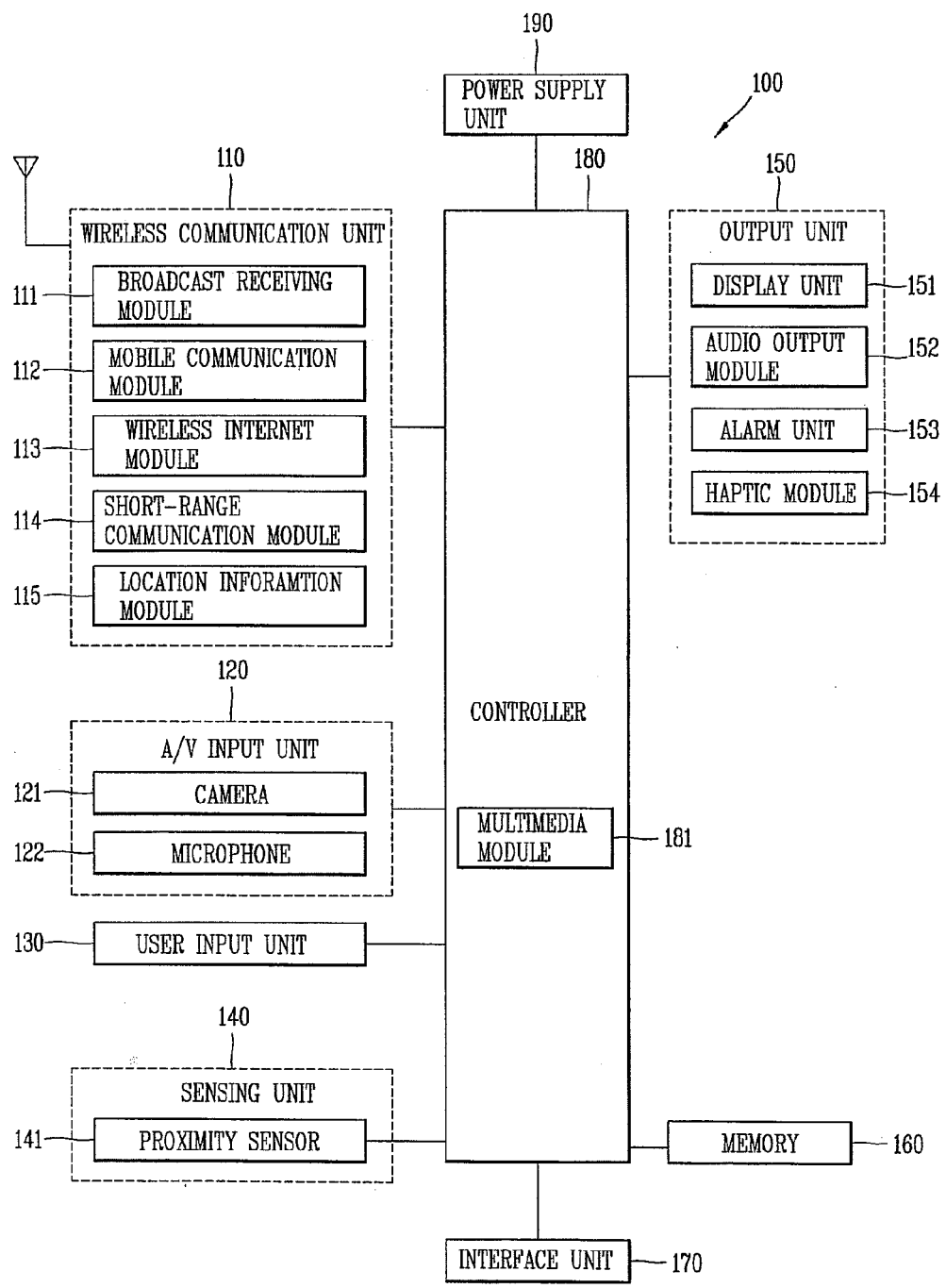
FIG. 1 is a block diagram of a mobile terminal in accordance with one exemplary embodiment.

FIG. 1 is a block diagram of a mobile terminal in accordance with one embodiment. Other embodiments and configurations may also be provided.

The mobile terminal 100 may include components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 1 shows the mobile terminal 100 having various components, but it is understood that implementing all of the illustrated components is not a requirement. Greater or fewer components may alternatively be implemented.

The wireless communication unit 110 may include one or more components that permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless internet module 113, a short-range communication module 114, a location information module 115 (or position location module) and the like.

The broadcast receiving module 111 may receive a broadcast signal and/or broadcast associated information from an external broadcast managing entity via a broadcast channel.

The broadcast channel may include a satellite channel and a terrestrial channel. The broadcast managing entity may indicate a server that generates and transmits a broadcast signal and/or broadcast associated information or a server that receives a pre-generated broadcast signal and/or broadcast associated information and sends them to the mobile terminal. Examples of broadcast associated information may include information associated with a broadcast channel, a broadcast program, a broadcast service provider, and/or the like. The broadcast signal may be implemented as a TV broadcast signal, a radio broadcast signal, and a data broadcast signal, for example. The broadcast signal may further include a data broadcast signal combined with a TV or radio broadcast signal.

The broadcast associated information may indicate information related to a broadcast channel, a broadcast program and/or a broadcast service provider. The broadcast associated information may be provided via a mobile communication network, and may be received by the mobile communication module 112.

The broadcast associated information may be implemented in various formats. For example, broadcast associated information may include Electronic Program Guide (EPG) of Digital Multimedia Broadcasting (DMB), Electronic Service Guide (ESG) of Digital Video Broadcast-Handheld (DVB-H), and/or the like.

The broadcast receiving module 111 may receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T), and/or the like. The broadcast receiving module 111 may be configured to be suitable for every broadcast system that transmits broadcast signals as well as the digital broadcasting systems.

Broadcast signals and/or broadcast associated information received via the broadcast receiving module 111 may be stored in a suitable device, such as the memory 160.

The mobile communication module 112 may transmit/receive wireless signals to/from at least one of network entities (e.g., base station, an external mobile terminal, a server, etc.) on a mobile communication network. The wireless signals may include audio call signal, video call signal, and/or various formats of data according to transmission/reception of text/multimedia messages.

The wireless internet module 113 may support wireless Internet access for the mobile terminal. The wireless internet module may be internally or externally coupled to the mobile terminal 100. Examples of such wireless Internet access may include Wireless LAN (WLAN), Wi-Fi, Wireless Broadband (Wibro), World Interoperability for Microwave Access (Wimax), High Speed Downlink Packet Access (HSDPA), and the like.

The short-range communication module 114 may be a module for short-range communications. Suitable technologies for implementing this module may include BLUETOOTH, Radio Frequency IDentification (RFID), Infrared Data Association (IrDA), Ultra-WideBand (UWB), ZigBee, and the like.

The location information module 115 may be a module for detecting or calculating a position of a mobile terminal. A Global Position System (GPS) module is one example of the location information module 115.

The A/V input unit 120 may be configured to provide audio or video signal input to the mobile terminal 100. The A/V input unit 120 may include a camera 121 and a microphone 122. The camera 121 may receive and process image frames of still pictures or video obtained by image sensors in a video call mode or a capturing mode. The processed image frames may be displayed on a display 151 (or display unit). The image frames processed by the camera 121 may be stored in the memory 160 or transmitted to an exterior via the wireless communication unit 110. Two or more cameras 121 may be provided according to configuration of the mobile terminal 100.

The microphone 122 may receive an external audio signal via a microphone while the mobile terminal is in a particular mode, such as a phone call mode, a recording mode, a voice recognition mode, and/or the like. This audio signal may be processed into digital data. The processed digital data may be converted for output into a format that is transmittable to a mobile communication base station via the mobile communication module 112 in case of the phone call mode. The microphone 122 may include assorted noise removing algorithms to remove (or cancel) noise generated in the course of receiving the external audio signal.

The user input unit 130 may generate input data inputted by a user to control operation of the mobile terminal 100. The user input unit 130 may include a keypad, a dome switch, a touchpad (e.g., static pressure/capacitance), a jog wheel, a jog switch and/or the like.

The sensing unit 140 may provide status measurements of various aspects of the mobile terminal 100. For example, the sensing unit 140 may detect an open/close status of the mobile terminal 100, a change in a location of the mobile terminal 100, a presence or absence of user contact with the mobile terminal 100, the location of the mobile terminal 100, acceleration/deceleration of the mobile terminal 100, and/or the like, so as to generate a sensing signal for controlling operation of the mobile terminal 100. For example, regarding a slide-type mobile terminal, the sensing unit 140 may sense whether a sliding portion of the mobile terminal 100 is open or closed. Other examples may include sensing functions, such as the sensing unit 140 sensing presence or absence of power provided by the power supply 190, presence or absence of a coupling or other connection between the interface unit 170 and an external device, and/or the like. The sensing unit 140 may include a proximity sensor 141.

The output unit 150 may output an audio signal, a video signal and/or a tactile signal. The output unit 150 may include the display 151, an audio output module 152, an alarm 153 (or alarm unit), a haptic module 154 and/or the like.

The display 151 may output information processed in the mobile terminal 100. For example, when the mobile terminal 100 is operating in a phone call mode, the display 151 may provide a User Interface (UI) or a Graphic User Interface (GUI) that includes information associated with the call. When the mobile terminal 100 is operating in a telephony (video) call mode or a capturing mode, the display 151 may display the captured and/or received image, UI and/or GUI.

The display 151 may be implemented using, for example, a Liquid Crystal Display (LCD), a Thin Film Transistor-Liquid Crystal Display (TFT-LCD), an Organic Light-Emitting Diode (OLED), a flexible display, a three-dimensional (3D) display, and/or the like.

Some of the displays may be configured to be transparent or light-transmittable such that it is possible to see the exterior therethrough. These displays may be called transparent displays. A representative example of the transparent display may be a Transparent Organic Light Emitting Diode (TOLED), and/or the like. This structure may allow the user to see an object, which is located at a rear of the terminal, via an area of the terminal body, which is occupied by the display 151.

The mobile terminal 100 may include two or more of such displays 151. For example, the mobile terminal 100 may include a plurality of display units that are arranged on one surface to be spaced apart from or integrated with each other, and/or arranged on different surfaces.

If the display 151 and a touch sensitive sensor (referred to as a touch sensor) have a layered structure therebetween, the structure may be referred to as a touch screen. The display 151 may be used as an input device in addition to an output device. The touch sensor may be implemented as a touch film, a touch sheet, a touchpad, and/or the like.

The touch sensor may be configured to convert changes of a pressure applied to a specific part of the display 151, or a capacitance occurring from a specific part of the display 151, into electric input signals. The touch sensor may be configured to sense not only a touched position and a touched area, but also touch pressure.

When touch inputs are sensed by the touch sensors, corresponding signals may be transmitted to a touch controller. The touch controller may process the received signals, and then transmit corresponding data to the controller 180. Accordingly, the controller 180 may sense which region of the display 151 has been touched.

A proximity sensor 141 may be arranged at an inner region of the mobile terminal 100 covered by the touch screen, and/or near the touch screen. The proximity sensor 141 may indicate a sensor to sense presence or absence of an object approaching a surface to be sensed, or an object disposed near a surface to be sensed, by using an electromagnetic field or infrared rays without a mechanical contact. The proximity sensor 141 may have a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen may be sensed by changes of an electromagnetic field. In this example, the touch screen (touch sensor) may be categorized as a proximity sensor.

For ease of explanation, a status that the pointer is positioned to be proximate onto the touch screen without contact may be referred to as a proximity touch, whereas a status that the pointer substantially comes in contact with the touch screen may be referred to as a contact touch. For the position corresponding to the proximity touch of the pointer on the touch screen, such position may correspond to a position where the pointer faces perpendicular to the touch screen upon the proximity touch of the pointer.

The proximity sensor 141 may sense proximity touch, and/or proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160, in a call-receiving mode, a call-placing mode, a recording mode, a voice recognition mode, a broadcast reception mode, and/or so on. The audio output module 152 may output audio signals relating to functions performed in the mobile terminal 100 (e.g., sound alarming a call received or a message received, and/or so on). The audio output module 152 may include a receiver, a speaker, a buzzer, and/or so on.

The alarm 153 (or alarm unit) may output signals notifying occurrence of events from the mobile terminal 100. The events occurring from the mobile terminal 100 may include a call received, a message received, a key signal input, a touch input, and/or so on. The alarm unit 153 may output not only video or audio signals, but also other types of signals such as signals notifying occurrence of events in a vibration manner. Since the video or audio signals can be output through the display 151 or the audio output module 152, the display 151 and the audio output module 152 may be categorized as part of the alarm 153.

The haptic module 154 may generate various tactile effects that a user can feel. A representative example of the tactile effects generated by the haptic module 154 may be vibration. Vibration generated by the haptic module 154 may have a controllable intensity, a controllable pattern, and/or so on. For example, different vibration may be output in a synthesized manner and/or in a sequential manner.

The haptic module 154 may generate various tactile effects, including not only vibration, but also arrangement of pins vertically moving with respect to a skin being touched (contacted), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and/or the like.

The haptic module 154 may be configured to transmit tactile effects (signals) through a user's direct contact, or a user's muscular sense using a finger or a hand. The haptic module 154 may be implemented in two or more in number based on configuration of the mobile terminal 100.

The memory 160 may store a program for processing and control of the controller 180. Alternatively, the memory 160 may temporarily store input/output data (e.g., phonebook data, messages, still images, video and/or the like). The memory 160 may store data related to various patterns of vibrations and audio output upon the touch input on the touch screen.

The memory 160 may be implemented using any type of suitable storage medium including a flash memory type, a hard disk type, a multimedia card micro type, a memory card type (e.g., SD or DX memory), Random Access Memory (RAM), Static Random Access Memory (SRAM), Read-Only Memory (ROM), Electrically Erasable Programmable Read-Only Memory (EEPROM), Programmable Read-Only Memory (PROM), magnetic memory, magnetic disk, optical disk, and/or the like. The mobile terminal 100 may operate a web storage that performs the storage function of the memory 160 on the Internet.

The interface unit 170 may be implemented to interface the mobile terminal 100 with external devices. The interface unit 170 may allow a data reception from an external device, a power delivery to each component in the mobile terminal 100, or a data transmission from the mobile terminal 100 to an external device. The interface unit 170 may include, for example, wired/wireless headset ports, external charger ports, wired/wireless data ports, memory card ports, ports for coupling devices having an identification module, audio Input/Output (I/O) ports, video I/O ports, earphone ports, and/or the like.

The identification module may be configured as a chip for storing various information required to authenticate an authority to use the mobile terminal 100, which may include a User Identity Module (UIM), a Subscriber Identity Module (SIM), and/or the like. The device having the identification module (hereinafter referred to as an identification device) may be implemented in a type of smart card. The identification device may be coupled to the mobile terminal 100 via a port.

The interface unit 170 may serve as a path for power to be supplied from an external cradle to the mobile terminal 100 when the mobile terminal 100 is connected to the external cradle or as a path for transferring various command signals input from the cradle by a user to the mobile terminal 100. Such various command signals or power input from the cradle may operate as signals for recognizing that the mobile terminal 100 has accurately been mounted to the cradle.

The controller 180 may control overall operations of the mobile terminal 100. For example, the controller 180 may perform the control and processing associated with telephony calls, data communications, video calls, and/or the like. The controller 180 may include a multimedia module 181 that provides multimedia playback. The multimedia module 181 may be configured as part of the controller 180 or as a separate component.

The controller 180 may perform a pattern recognition processing so as to recognize writing or drawing input on the touch screen as text or image.

The power supply 190 (or power supply unit) may provide power required by various components under the control of the controller 180. The provided power may be internal power, external power, and/or a combination thereof.

Various embodiments described herein may be implemented in a computer-readable medium using, for example, software, hardware, or some combination thereof.

For a hardware implementation, embodiments described herein may be implemented within one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, microprocessors, other electronic units designed to perform the functions described herein, and/or a selective combination thereof. In some cases, such embodiments may be implemented by the controller 180.

For software implementation, embodiments such as procedures and functions may be implemented together with separate software modules each of which may perform at least one of functions and operations. The software codes can be implemented with a software application written in any suitable programming language. The software codes may also be stored in the memory 160 and executed by the controller 180.

Figure 2A:
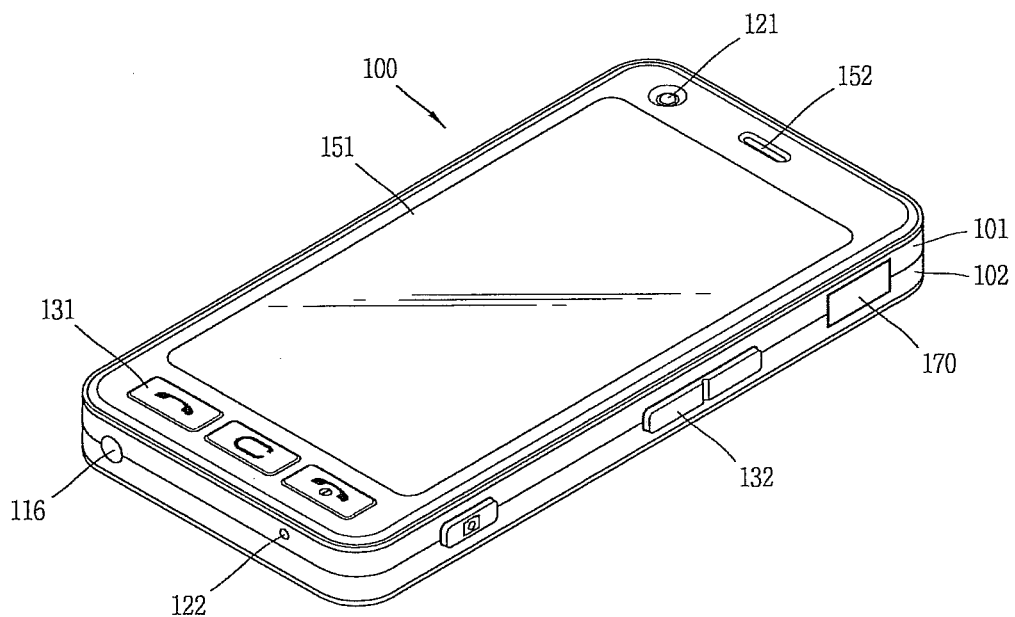
FIGS. 2A and 2B are perspective views showing an appearance of the mobile terminal.

FIG. 2A is a front perspective view showing an example of the mobile terminal 100.

The mobile terminal 100 disclosed herein is provided with a bar-type terminal body. However, embodiments are not limited to this type of terminal, but are also applicable to various structures of terminals such as slide type, folder type, swivel type, swing type, and/or the like, in which two or more bodies are combined with each other in a relatively movable manner.

A body may include a case (also referred to as casing, housing, cover, etc.) that defines an appearance of the mobile terminal 100. The case may be divided into a front case 101 and a rear case 102. A space formed between the front and rear cases 101 and 102 may accommodate various electronic components. At least one intermediate case may be further disposed between the front case 101 and the rear case 102.

Such cases may be injected using a synthetic resin or may be formed of a metal, such as stainless steel (STS), titanium (Ti) or the like.

The terminal body is shown having the display 151, the audio output module 152, the camera 121, a user input unit 130/131, 132, the microphone 122, the interface unit 170, and the like.

The display 151 may occupy most of a principal surface of the front case 101. The audio output module 152 and the camera 121 may be disposed near one of both end portions of the display 151, and the user input unit 131 and the microphone 122 on the other end portion of the display 151. The user input unit 131, the interface unit 170 and the like may be disposed on side surfaces of the front and rear cases 101 and 102.

The user input unit 130 may be manipulated to allow inputting of commands for controlling operations of the mobile terminal 100, and may include a plurality of first manipulation units 131, 132. The plurality of manipulation units 131, 132 may be referred to as a manipulating portion. Such manipulating portion may employ any tactile manner that a user can touch or tap for manipulation.

The first and second manipulation units 131, 132 may be set to allow inputting of various contents. For example, the first manipulation unit 131 may be configured to input commands such as START, END, SCROLL or the like, and the second manipulation unit 132 may be configured to input commands, such as a volume adjustment of sounds output from the audio output module 152, conversion of the display module into a touch recognition mode, or the like.

Figure 2B:
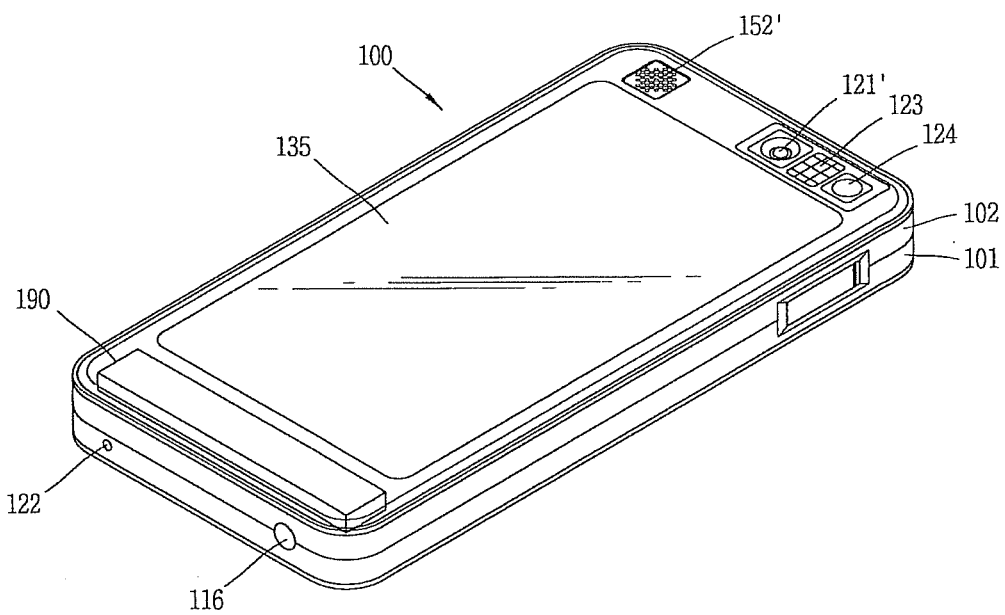

FIG. 2B is a rear perspective view of the mobile terminal shown in FIG. 2A.

Referring to FIG. 2B, a rear surface of the terminal body (i.e., the rear case 102 of the terminal body) may further be provided with a camera 121'. The camera 121' may face a direction that is opposite to a direction faced by the camera 121 (see FIG. 2A), and may have different pixels from those of the camera 121.

For example, the camera 121 may operate with relatively lower pixels (lower resolution). Thus, the camera 121 may be useful when a user can capture his face and send it to another party during a video call or the like. The camera 121' may operate with a relatively higher pixels (higher resolution) such that it can be useful for a user to obtain higher quality pictures for later use. The cameras 121 and 121' may be installed in the terminal body to be rotatable or popped up.

A flash 123 and a mirror 124 may additionally be disposed adjacent to the camera 121'. The flash 123 may operate in conjunction with the camera 121' when taking a picture using the camera 121'. The mirror 124 can cooperate with the camera 121' to allow a user to photograph himself in a self-portrait mode.

An audio output module 152' may be further disposed at a rear face of the terminal body, namely the rear case 102. The audio output module 152' may cooperate with the audio output module 152 (see FIG. 2A) to provide a stereo output. The audio output module 152' may be configured to operate as a speakerphone.

An antenna 116 for receiving a broadcast signal may be further disposed at the side surface of the terminal body, in addition to an antenna for connecting calls. The antenna 116 that configures a part of the broadcast receiving module 111 may be retractable into the terminal body.

The power supply unit 190 for supplying power to the mobile terminal 100 may be mounted in the terminal body. The power supply unit 190 may be mounted in the terminal body or detachably coupled directly onto outside of the terminal body.

The rear case 102 may be further provided with a touchpad 135 for detecting a touch input. Similar to the display 151, the touchpad 135 may be implemented as a light-transmissive type. The touchpad 135 may also include a rear display unit for outputting visual information. The information output from both surfaces may all be controlled by the touchpad 135.

As the touchpad 135 operates mutually with the display 151, a partial area (portion) of an image output on the display 151 may be designated using a touch input sensed on the touchpad 135. For ease of user convenience, a method of outputting an image corresponding to the partial area of the output image into another format may be described.

Figure 3:
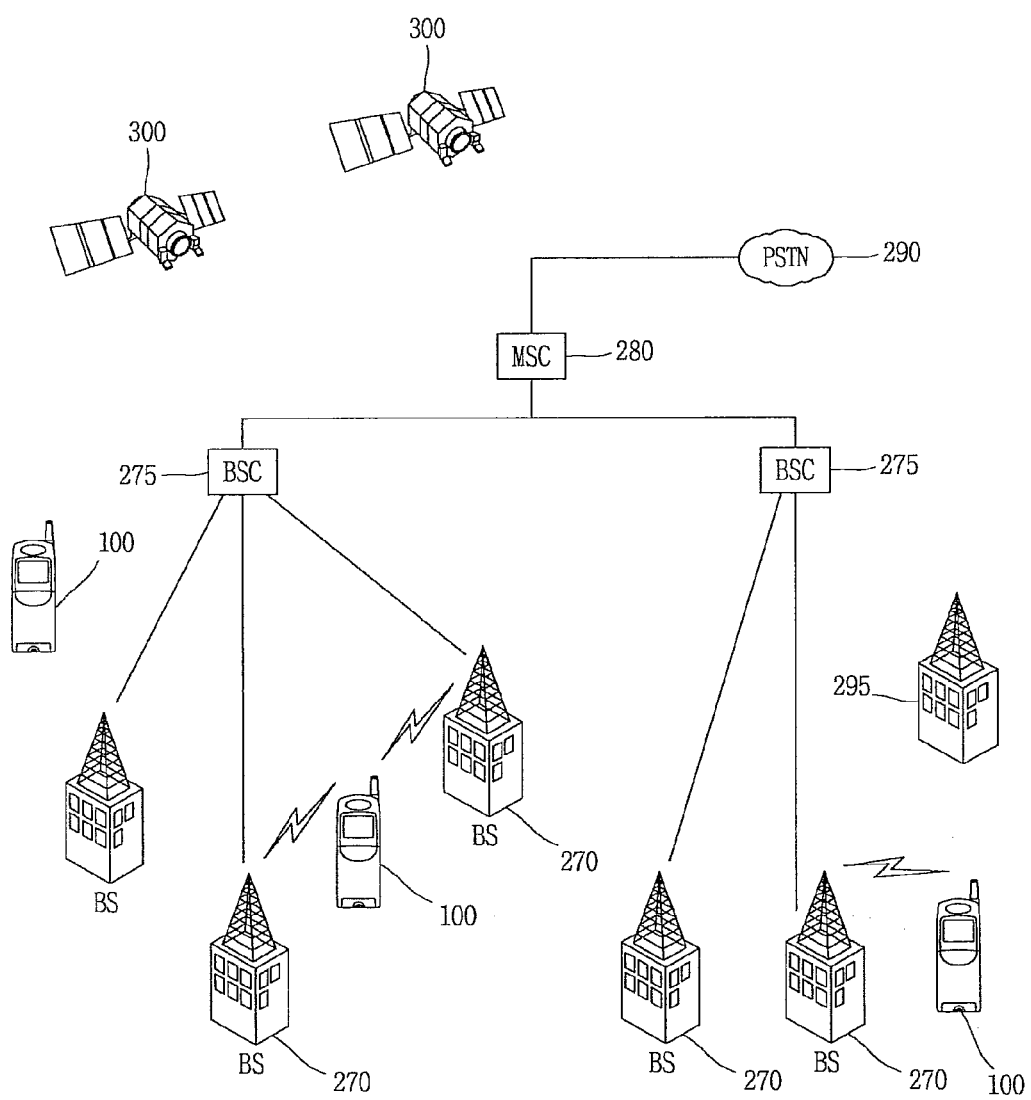
FIG. 3 is a block diagram of a wireless communication system operable with the mobile terminal.

FIG. 3 is a block diagram of a wireless communication system operable with the mobile terminal 100.

Such communication systems may utilize different air interfaces and/or physical layers. Examples of such air interfaces utilized by the communication systems may include Frequency Division Multiple Access (FDMA), Time Division Multiple Access (TDMA), Code Division Multiple Access (CDMA), and Universal Mobile Telecommunications System (UMTS), the Long Term Evolution (LTE) of the UMTS, the Global System for Mobile Communications (GSM), and the like. By way of non-limiting example only, a further description may relate to a CDMA communication system, but such teachings may apply equally to other system types including the CDMA wireless communication system.

Referring now to FIG. 3, a CDMA wireless communication system may be shown as having a plurality of mobile terminals 100, a plurality of base stations (BSs) 270, base station controllers (BSCs) 275, and a mobile switching center (MSC) 280. The MSC 280 may be configured to interface with a conventional Public Switch Telephone Network (PSTN) 290. The MSC 280 may also be configured to interface with the BSCs 275. The BSCs 275 may be coupled to the base stations 270 via backhaul lines. The backhaul lines may be configured in accordance with any of several known interfaces including, for example, E1/T1, ATM, IP, PPP, Frame Relay, HDSL, ADSL, or xDSL. The plurality of BSCs 275 may be included in the system as shown in FIG. 3.

Each base station 270 may include one or more sectors, each sector having an omni-directional antenna or an antenna pointed in a particular direction radially away from the base station 270. Alternatively, each sector may include two or more different antennas. Each base station 270 may be configured to support a plurality of frequency assignments, with each frequency assignment having a particular spectrum (e.g., 1.25 MHz, 5 MHz, etc.).

The intersection of sector and frequency assignment may be referred to as a CDMA channel. The base stations 270 may also be referred to as Base Station Transceiver Subsystems (BTSs). The term base station may be used to refer collectively to a BSC 275, and one or more base stations 270. The base stations may also be denoted as cell sites. Alternatively, individual sectors of a given base station 270 may be referred to as cell sites.

A broadcasting transmitter (BT) 295 may transmit a broadcast signal to the mobile terminals 100 operating within the system. The broadcast receiving module 111 (FIG. 1) may be configured inside the mobile terminal 100 to receive broadcast signals transmitted by the BT 295.

FIG. 3 further shows several Global Positioning System (GPS) satellites 300. Such satellites 300 may facilitate locating the position of at least one of plural mobile terminals 100. Two satellites are shown in FIG. 3, but it is understood that useful position information may be obtained with greater or fewer than two satellites. The location information module 115 (or GPS module) may cooperate with the satellites 300 to obtain desired position or location information. It is to be appreciated that other types of position detection technology, (i.e., location technology that may be used in addition to or instead of GPS location technology) may alternatively be implemented. If desired, at least one of the GPS satellites 300 may alternatively or additionally be configured to provide satellite DMB transmissions.

During operation of the wireless communication system, the base stations 270 may receive sets of reverse-link signals from various mobile terminals 100. The mobile terminals 100 may be engaging in calls, messaging, and/or executing other communications. Each reverse-link signal received by a given base station 270 may be processed within that base station 270. The resulting data is forwarded to an associated BSC 275. The BSC 275 may provide call resource allocation and mobility management functionality including orchestration of soft handoffs between base stations 270. The BSCs 275 may also route the received data to the MSC 280, which may then provide additional routing services for interfacing with the PSTN 290. The PSTN 290 may interface with the MSC 280, and the MSC 280 may interface with the BSCs 275, which in turn may control the base stations 270 to transmit sets of forward-link signals to the mobile terminals 100.

The present disclosure may provide a mobile terminal capable of designating a partial area (portion) of a predetermined (stereoscopic) image, which is displayed on a display (or display unit) of the mobile terminal, and converting the designated partial area of such image into another type of (stereoscopic) image.

The predetermined image (or first image) may be a two-dimensional (2D) image, and the another type of image (or second image) may be a stereoscopic Three-Dimensional (3D) image, and/or vise versa. The designation may be executed by a touch gesture. The touch gesture may be a touch gesture by a direct touch and a proximity touch, and may include a single touch and a multi-touch.

Figure 4:
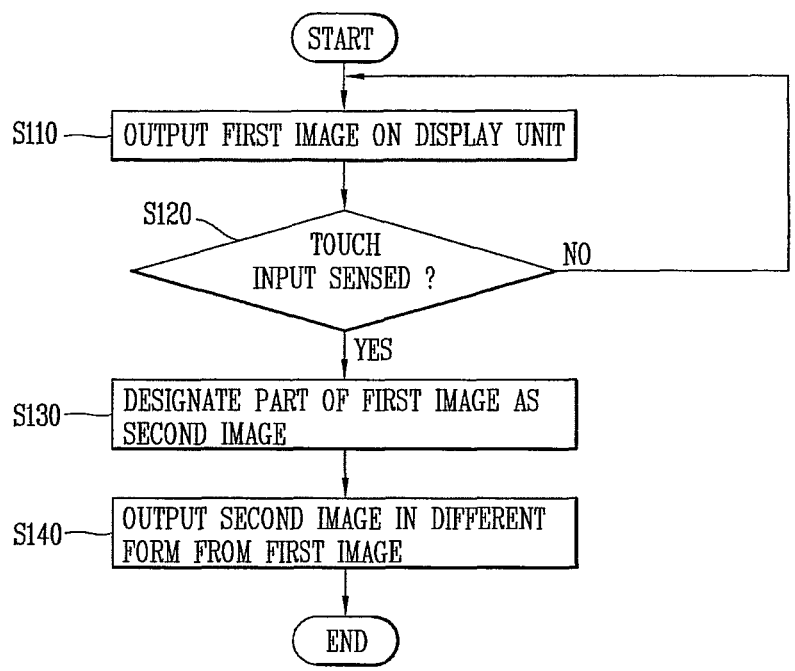
FIG. 4 is a flowchart showing an image converting method of a mobile terminal in accordance with one exemplary embodiment.

FIG. 4 is a flowchart showing an image converting method applied to the mobile terminal 100 in accordance with one exemplary embodiment. Other embodiments and configurations may also be provided.

As shown in FIG. 4, a first image may be output (or reproduced) on the display 151 of the mobile terminal 100 (S110). The first image may be a 2D image or a perceived 3D image. For ease of explanation, it is assumed that a 2D image is being displayed. When the 2D or 3D image is selected as the first image, a corresponding icon on an indicator part, located at an upper portion of a screen, may be activated.

When a user's predetermined touch input is sensed by the sensing unit 140 (or sensor) while the first image is being output (or displayed) (S120), the controller 180 may designate an object (or area) selected from the first image based on the touch input (S130). At least one object (or area) may be designated based on the touch input.

The touch input may be a touch gesture for selecting a specific object (or area) included in the first image. The touch input may be a multi-touch, a multi-drag and/or a drag and drop. The multi-touch may be when a touchpad or a touch screen may recognize several touch inputs at a same time. The multi-drag may be an operation of simultaneously touching two points and dragging them close to each other or apart from each other. The drag and drop may indicate that a specific object is dragged onto another position (area) or object with being touched.

The controller 180 may display the designated object (or area) such that the user may visually distinguish the designated object (or area). The distinguishable displaying of the object (or area) may disappear after a preset time.

When a predetermined touch input is sensed with respect to the designated object (or area), the controller 180 may convert the designated object (or area) into a second image whose format is different from the first image, which is currently output or displayed (S140).

With one object (or area) converted into the second image, another object may be designated by inputting a touch gesture moving across the one object. The designated another object may be automatically converted from a first image into the second image without a separate input. When a selected object (or area) is converted from a perceived 3D image into a 2D image, it may be set to have a greatest depth. When a plurality of objects are selected at a time that the selected object is converted from a 2D image into a 3D image, different depths may be set depending on distances.

Embodiments may execute an additional operation with respect to a corresponding object or area according to a type of touch input. The second image may be a 3D image since the first image may be a 2D image. Alternatively, when the first image is a 3D image, the second image may be a 2D image.

The additional operation may include enlargement of the designated object (in response to a double touch), and the type of touch input may include a single touch (short touch) or a double touch. When the type of touch input is input again while the distinguishable displaying is maintained, the corresponding object (or area) may be restored into the original state, namely the second image. That is, the 2D image and the 3D image may alternately appear every time of the touch input.

As another embodiment, when a preset number of objects (or more than a preset area) is designated, the controller 180 may automatically convert an entire screen from the first image into the second image. Additionally, when the first and second images are all 2D or 3D images, the converted image may be displayed with different depth from the image before conversion. That is, an image currently output on the display 151 may have a depth set based on a user's sight. Therefore, after selecting a specific object, when the user inputs a preset touch input for changing a type of image with respect to the specific object, the controller 180 may output the image by resetting a depth thereof based on the selected specific object or a screen.

The conversion of the stereoscopic type of the reproduced image may be automatically applied when selecting a stereoscopic convert icon displayed on one side of the display 151 and/or when setting a stereoscopic convert item to 'On' in a menu.

Embodiments may execute several operations, such as moving, capturing, recording, sharing and sending, with respect to the converted 2D image. The moving of the 2D image may be enabled by a touch & drag. The capturing and recording of the 2D image may be enabled by a touch input or a control menu, and the sending of the 2D image may be enabled by the control menu.

Only at least one object included in a currently output image may be designated by a touch gesture to be output as another type of image, different from the currently output image. This may allow a user to output a portion (in which the user is interested) into another form.

Figure 5A:
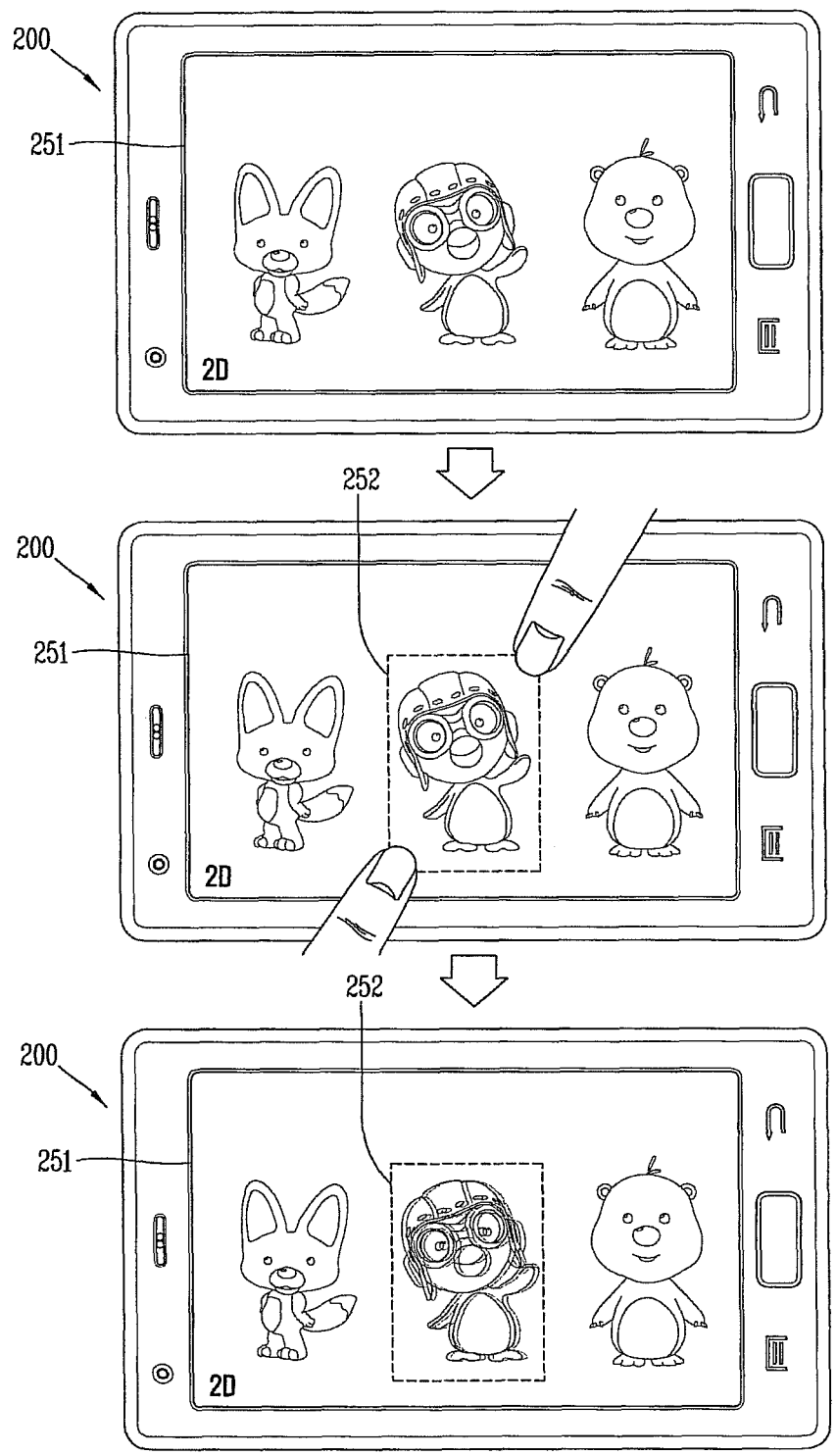
FIGS. 5A to 5C are overviews illustrating an example of an image output (conversion) of a mobile terminal according to the image converting method shown in FIG. 4.
Figure 5B:
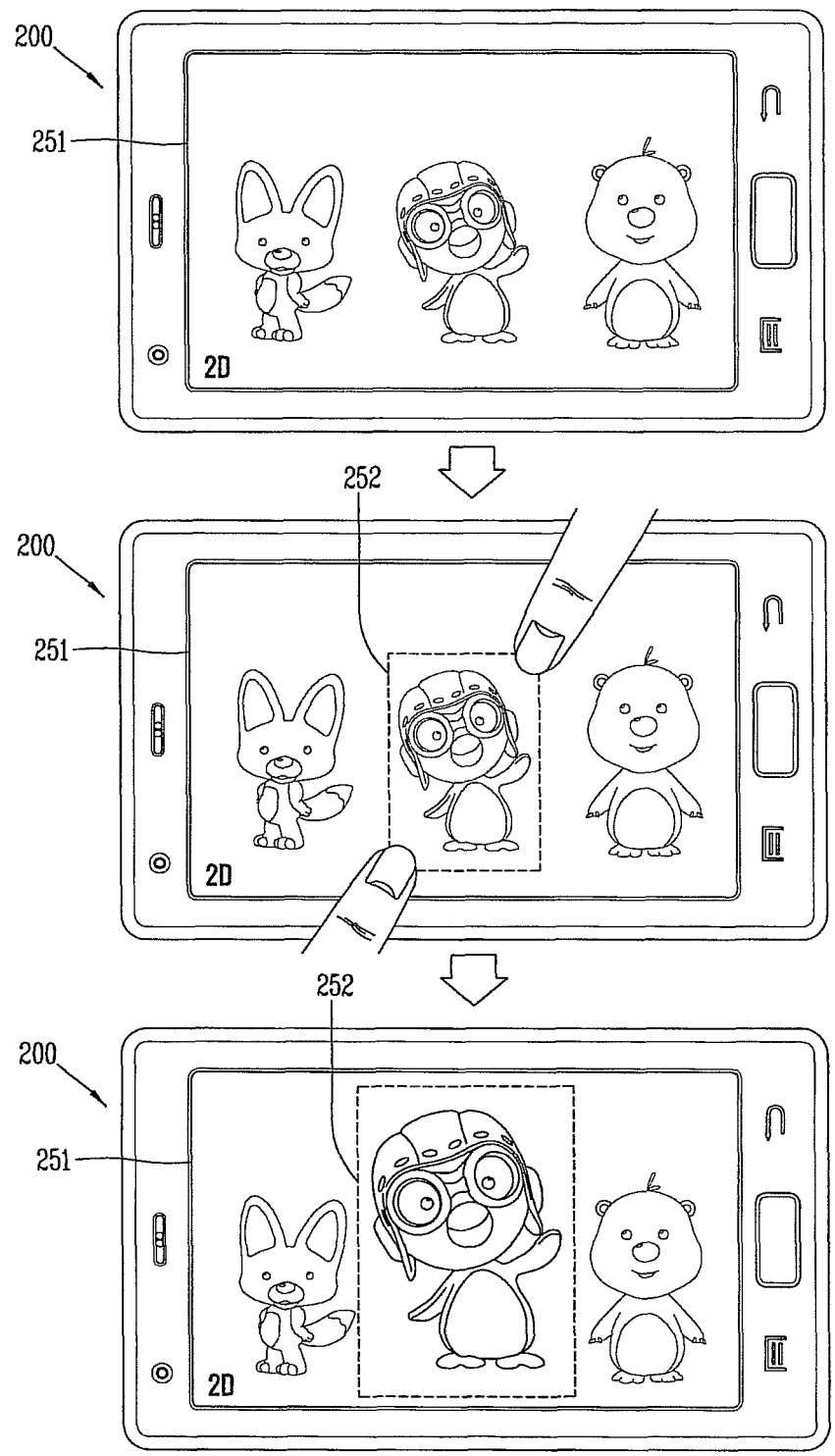
Figure 5C:
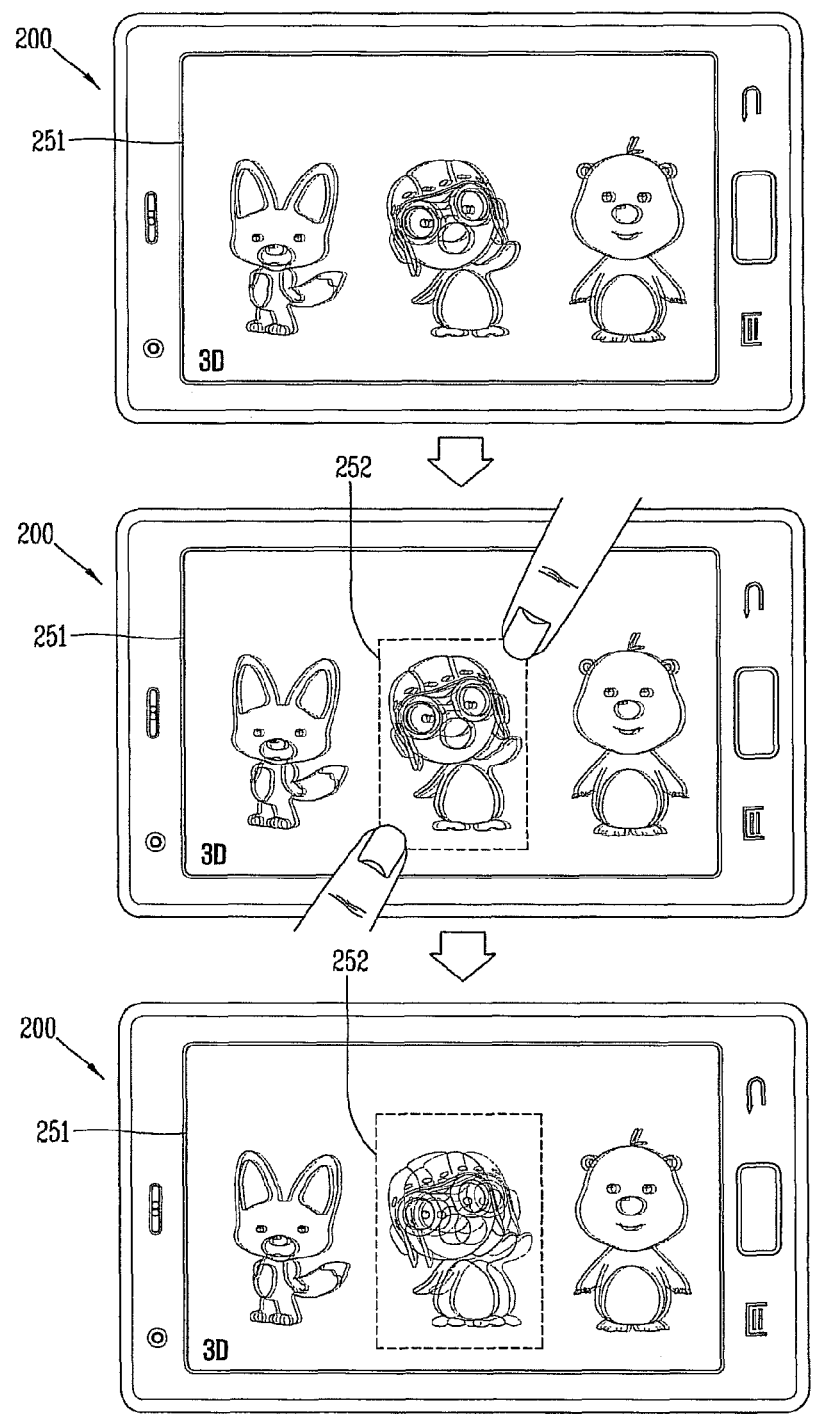

FIGS. 5A to 5C are overviews illustrating an example of an image conversion of a mobile terminal 200 according to the image converting method shown in FIG. 4. The mobile terminal 200 may correspond to the mobile terminal 100.

As shown in FIG. 5A, a first image may be output (or displayed) in a 2D form on a display 251 of the mobile terminal 200. A user may designate a specific area (portion) of the first image to watch (view) only in a 3D form. The specific area may be a designated area 252. For designating the specific area, the user may use one of various touch gestures.

As one example, the user may set (designate) a specific area by simultaneously touching two points on a screen. Once one area is designated, the controller 180 may indicate the designated area 252 (or object) within the first image based on the touched two points. On the other hand, even when two points are sequentially touched on the screen, the designated area 252 (or object) may be designated within the first image based on the two points. The designated area 252 may be an image conversion area and may be visually distinguishable by the user. A size and shape of the designated area 252 (or image conversion area) may be determined by a user's touch track.

The designated area 252 (or image conversion area) may disappear after a preset time.

The corresponding area or an object (e.g., Pororo) within the corresponding area may be converted into a perceived 3D image based on the touch position and touch type of the designated area 252. For example, when the object of the designated area 252 is touched (e.g., single touch), only the corresponding object may be output by being converted into a 3D image. When an edge (e.g., barrier) of the designated area 252 is touched, the corresponding area may be displayed by being entirely converted into the 3D image.

Therefore, the object (e.g., Pororo) corresponding to the designated area 252 may be converted into the second image. The second image may be output (or displayed) in form of a left-eye image and a right-eye image so as to be recognized as a 3D image. For example, the left-eye image and the right-eye image may be output in an overlapping manner or in an alternating manner.

Conversion of the output image from the 2D form into the 3D form may be executed by a converter chip for converting a 2D content into a 3D form.

The mobile terminal may output a partial area of a screen, on which an image is output in a 2D form, into a 3D form.

This may reduce a load and power consumption as compared with an entire screen being output in the 3D form.

When the first image is output in the 3D form, the second image may be output in the 2D form. The conversion of the output image from the 3D form into the 2D form may be executed by a converter chip for converting a 3D content into a 2D form.

FIG. 5B shows an example of converting a format of an area selected from a first image by enlarging the area in response to a user's touch input.

Referring to FIG. 5B, an image may be output or displayed in a 2D image format on the display 251 of the mobile terminal 200. When two points are simultaneously touched on the screen, the specific area or the designated area 252 may be set (designated) within the first image based on the two points. On the other hand, when one point is touched on the screen and then dragged to another point (i.e., multi-dragging), an area may also be designated in the first image based on the two points.

Once the specific area or the designated area 252 is set (designated) within the first image, the controller 180 may identify the touch input and convert the designated area 252 into a 2D image. When the touch input is identified as a single touch, the first image may be converted into the second image as shown in FIG. 5A. On the other hand, when the touch input is identified as a double touch, an object (e.g., Pororo) corresponding to the designated area 252 may be enlarged and simultaneously converted into the second image. The second image may be output by being reduced to smaller than its original size based on a user setting.

When a touch input (e.g., double touch) is again sensed on the designated area 252 where the second image is output or displayed, the second image whose size has been enlarged (or reduced) as compared with its original size may be output or displayed in the original size.

The size of the second image may be adjusted by an input through the first or second manipulation units 131, 132.

FIG. 5C shows an example of adjusting a depth of a specific object within a first image when the specific image is output by being converted into a second image.

A first image may be output on the display 251 of the mobile terminal 200 in formats of a left-eye image and a right-eye image so as to be recognized as a perceived 3D image format. When two points are simultaneously touched on the screen, the designated area 252 may be set (designated) within the first image based on the two points. An image corresponding to the designated area 252 may be designated as a second image.

Alternatively, an image, which is located within a preset area of the screen defined based on a touch point, may be designated as the second image.

A 3D image format with a different depth may be recognized according to how much the left-eye image and the right-eye image overlap each other. This may allow the user to view the 3D image more stereoscopically by adjusting a depth to be appropriate for a viewing angle and a viewing environment. That is, a depth of a corresponding object (e.g., Pororo) may be output by being reset based on a screen or the corresponding object, other than the user's sight. That is, a level that an image may appear to be protruding may be adjusted again based on the screen other than the user's sight.

The second image output on the display 251 of the mobile terminal 200 may be output in a form exhibiting a different overlap level between the left-eye image and the right-eye image from the first image.

When a touch input is re-sensed on the designated area 252 where the second image is output, the second image may be output or displayed in the form exhibiting the same overlap level between the left-eye image and the right-eye image as the first image. Alternatively, the second image may be output in a form exhibiting a further different overlap level between the left-eye image and the right-eye image from the first image.

The second image may also be output by changing the overlap level between the left-eye image and the right-eye image in response to an input via the first or second manipulation units 131, 132.

The output form of the second image may change based on a user setting. That is, the output form of the second image may be set to be mutually converted into the 2D form and the 3D form, or to be output or displayed by being enlarged or reduced in size. Alternatively, the output form of the second image may be set to be output or displayed in a 3D form with a different depth.

Figure 6A:
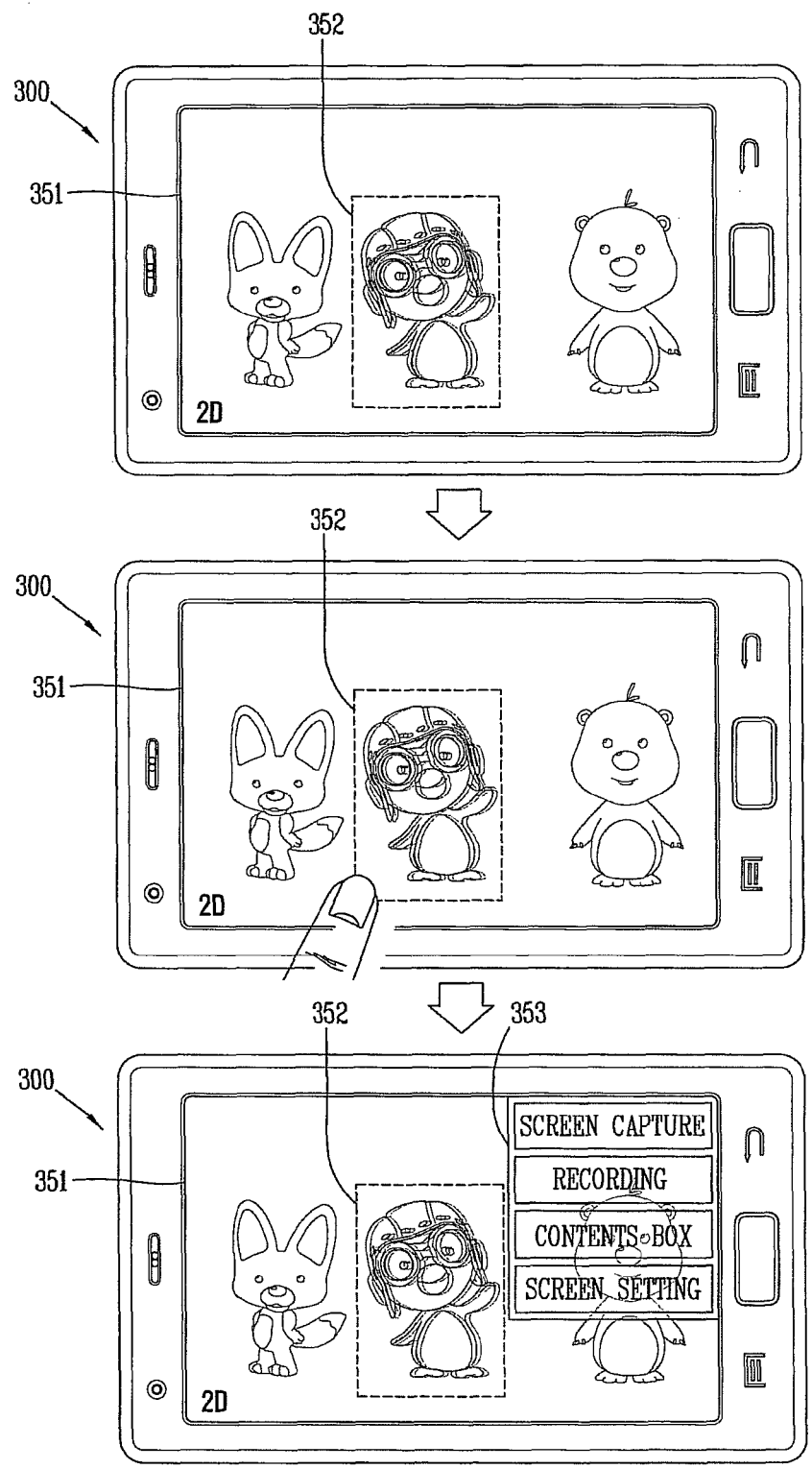
FIGS. 6A to 6C are overviews showing another example of an image output (conversion) of a mobile terminal according to the image converting method shown in FIG. 4.
Figure 6B:
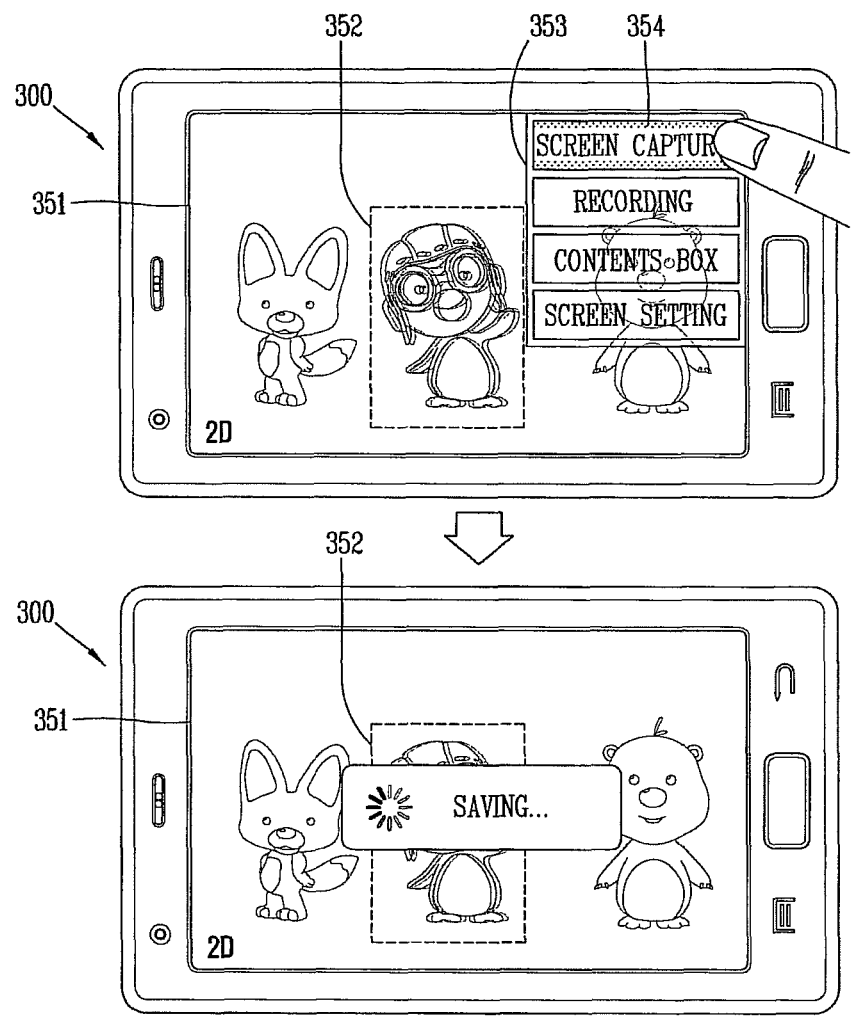
Figure 6C:
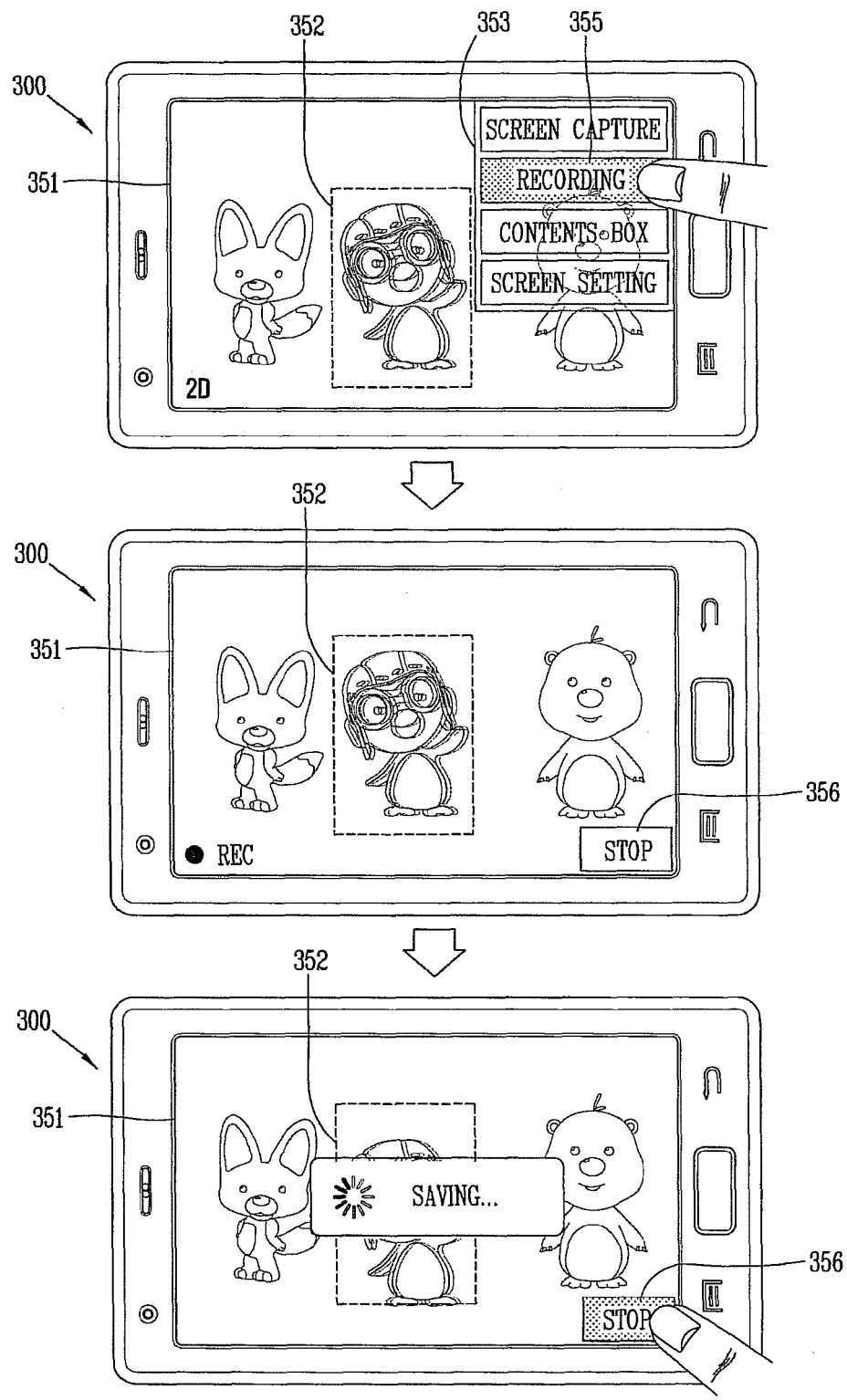

FIGS. 6A to 6C are overviews showing an example of executing an additional operation for an object converted by the image converting method shown in FIG. 4. FIGS. 6A-6C relate to a mobile terminal 600 that may correspond to mobile terminal 100.

The additional operation may include screen capture, recording, screen setting and/or sending.

A specific area or a designated area 352 may be output by being converted from a first image (e.g., 2D) into a second image (e.g., 3D) on a display 351 (or display unit) of the mobile terminal 300.

When a touch input (e.g., long touch) is sensed on the designated area 352, the controller 180 may control the display 351 to pause reproduction or outputting of the designated area 352, and display menus or function menus 353 of executable functions (e.g., screen capture, recording, contents box, screen setting, etc.).

The function menu 353 may overlap the output image. The function menu 353 may disappear when a touch input is re-sensed on the designated area 352 or after a preset time.

FIG. 6B shows an operation when a screen capture item is selected from the function menu 353.

As shown in FIG. 6B, when an input for selecting the function menu 353 displayed on the display 351 is sensed (e.g., when 'screen capture' item is selected), the controller 180 may capture an object (e.g., Pororo) converted into the second image to store in the memory 160 and simultaneously display on the screen a message indicating that the screen is currently being stored.

FIG. 6C shows an operation when a recording item is selected from the function menu 353.

As shown in FIG. 6C, when 'recording' item is selected from the function menu 353 displayed on the display 351, the controller 180 may execute recording for the object (e.g., Pororo) converted into the second image and may simultaneously display on the screen a message indicating that the recording is being executed. The recording operation may be terminated when a stop button is input.

Figure 7A:
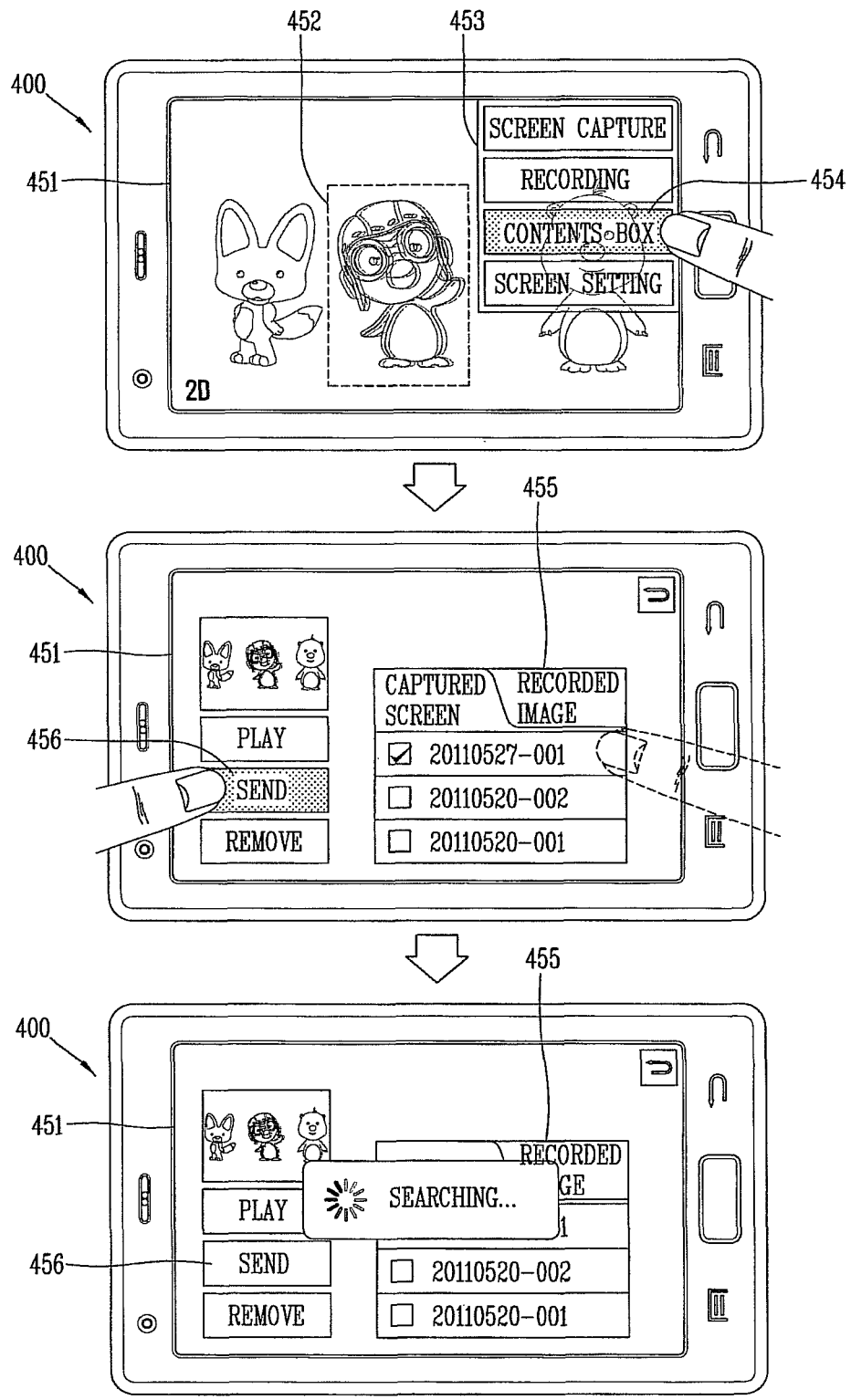
FIGS. 7A to 7C are overviews showing another example of an image output (conversion) of a mobile terminal according to the image converting method shown in FIG. 4.
Figure 7B:
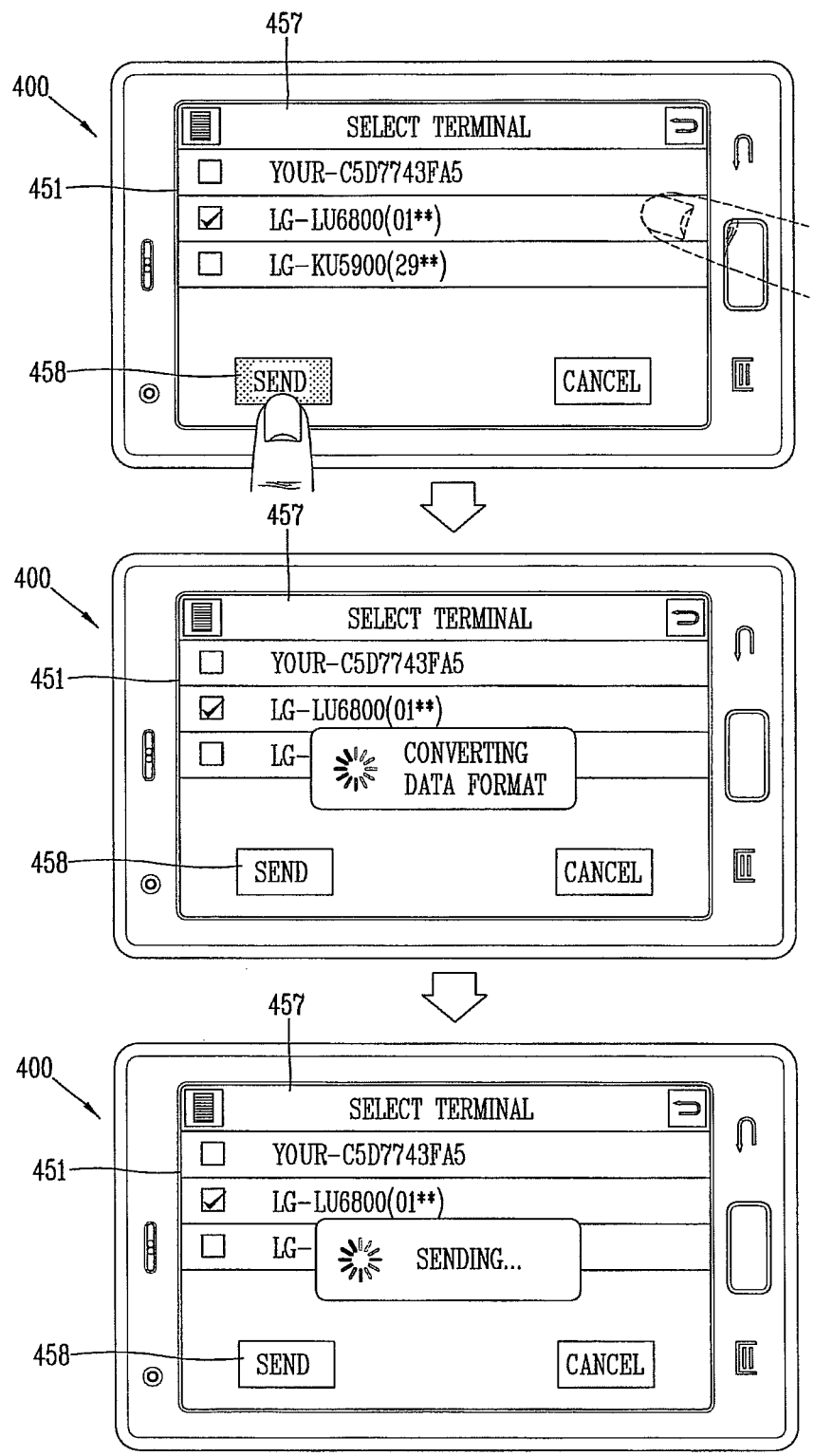
Figure 7C:
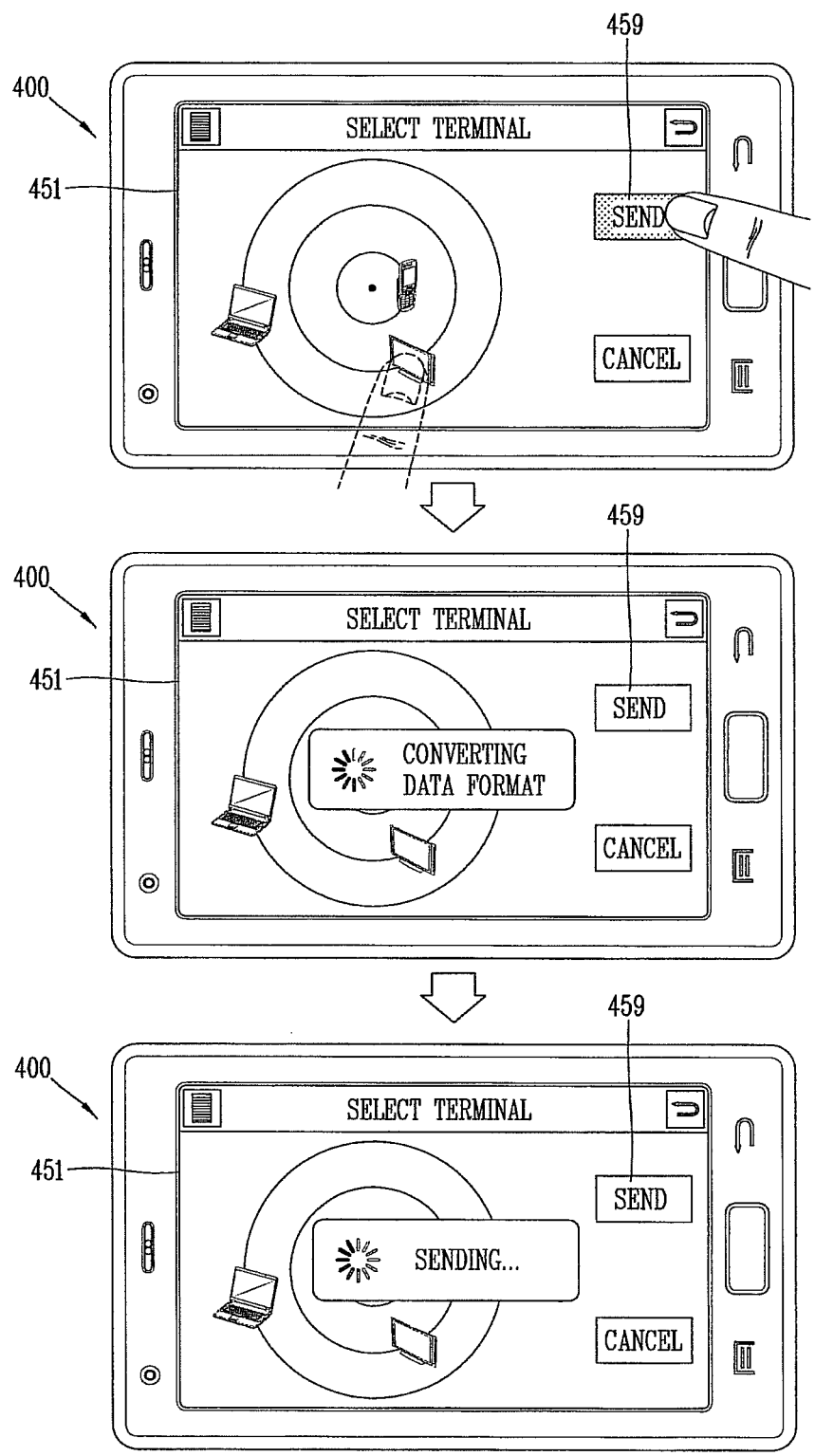

FIGS. 7A to 7C are overviews showing an example of executing an additional operation for an object converted by the image converting method shown in FIG. 4, which shows a sending operation. FIGS. 7A-7C show a mobile terminal 400 that may correspond to the mobile terminal 100.

As shown in FIG. 7A, when an input for selecting a function menu 453 displayed on a display 451 of the mobile terminal 400 is sensed (e.g., when a select menu 454 corresponding to 'contents box' is touched), then the controller 180 may display a list 455 of captured screens or recorded images stored in the memory 160. When an input for selecting a captured image or recorded image in the displayed list 455 is sensed, the corresponding captured image or recorded image may be selected.

With the captured screen or recorded image selected, when a selection input for a menu displayed on the display 451 is sensed (e.g., a select menu 456 corresponding to 'send' is touched), the controller 180 may retrieve a terminating device (terminating terminal) to which the selected captured screen or recorded image is to be sent. The terminating device may include another mobile terminal, TV, PC, an electronic frame, and/or the like. The terminating device may be referred to as an electronic device.

The controller 180 may use a short-range wireless communication technology, such as Digital Living Network Alliance (DLNA) or Near Field Communication (NFC) when retrieving terminating terminals to which image data is to be sent.

The DLNA may indicate a specification for allowing digital devices (such as smart phones) to freely share media contents, such as music, photo, video and the like, with other digital devices via a home network. The NFC may indicate a short-range wireless communication technology for sending data between wireless devices using low power within a distance of several ten centimeters to several hundred meters.

Referring to FIG. 7B, a list 457 of terminating devices to which image data is transmittable may be displayed on the display 451 of the mobile terminal 400.

When 'send' is selected after selecting a specific device from the displayed list 457 of the terminating devices, the controller 180 may convert the format of the second image to send to the selected terminating device.

The list 457 of the terminating terminals may be displayed on the display 451 in various alignment manners (e.g., a distance-based order, an alphabet-based order, an order of image data transmission frequencies, etc.). The alignment manner may be selected by the user.

The terminating device to which the captured screen or recorded image is to be sent may be displayed in a form of an icon as well as in a form of a list.

As shown in FIG. 7C, icons of terminating terminals to which image data is transmittable may be displayed on the display 451 of the mobile terminal 400. The icons may be displayed with a spaced distance and directionality based on the mobile terminal 400.

When a select menu 459 corresponding to 'send' is touched after a specific icon is selected from the displayed icons, the controller 180 may send the image data by converting it into a format suitable for the selected terminating device.

The terminating terminal that has received the image data may immediately reproduce (output) the received image data. This may be allowed by an N-screen technology. The N-screen may indicate a service of allowing one content to be continuously used in various digital devices without congestion.

A 'send' item (not shown) may be directly selected from the function menu 353 (FIG. 6A) to send the object (e.g., Pororo) converted into the second image.

When the 'send' item is directly selected from the function menu 353, the controller 180 may retrieve terminating devices for sending the second image thereto, and display the retrieved terminating devices on a screen based on the second image.

Afterwards, when the user drags the second image converted into the 3D form (e.g., when the user directly touches the second image and drags it) to a specific terminating device (e.g., PC), the controller 180 may convert the second image into a format appropriate for the PC so as to send to the PC. The user may view the second image output on the mobile terminal through a greater screen.

Alternatively, the capturing, recording and sending operations may be executed according to a touch input without separately selecting a menu.

As one example, when a double touch is provided on a partial area (object) of a first image (e.g., 2D) with the partial area designated, the corresponding area may be enlarged and simultaneously converted into a second image (e.g., 3D). Under this state, when a double touch is again sensed, the image may change into its original size and then the recording operation may be started. When a single touch is sensed with respect to the enlarged second image, the capturing operation may be started. When a multi-point touch is sensed, the sending operation may be started.

Figure 8:
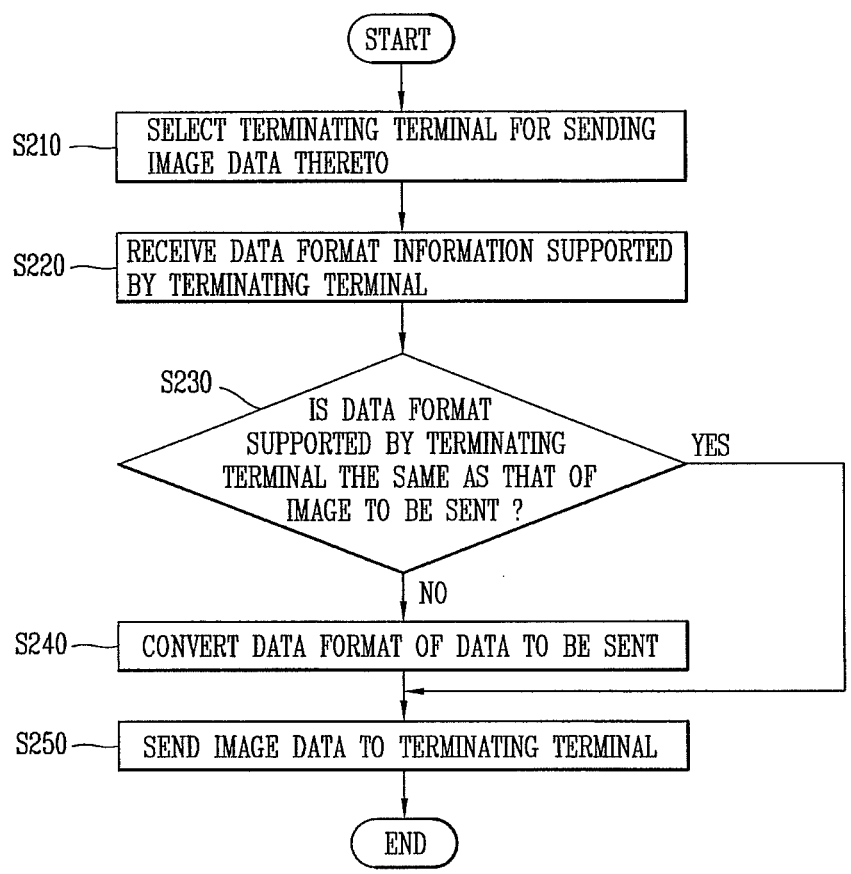
FIG. 8 is a flowchart showing an image converting method of a mobile terminal in accordance with an exemplary embodiment.

FIG. 8 is a flowchart showing an image converting method applied to the mobile terminal 100 in accordance with an exemplary embodiment. Other embodiments and configurations may also be provided.

As shown in FIG. 8, when a terminating terminal to which image data is to be sent is selected (S120), a receiving unit may receive data format information that the selected terminating terminal supports (S220).

The format may indicate a name of codec that compresses a file. A video file may be formed by combination of a video file and an audio file. Therefore, a video codec and an audio codec may be present independently. A method of bundling digital-compressed video and audio files may be called container. Types of such container may include avi, wmv, mpeg, mov, rmvb, mp4 and the like, which are well known as file extensions.

The controller 180 may determine, based on the received information, whether or not a data format supported by the terminating terminal is the same as a data format of an image to be sent (S230), and if different, convert the data format of the image to be sent (S240).

A file format and a combination form thereof may be different according to a type of container. Therefore, only an image that is compressed by a codec appropriate for a data format recognizable by the terminating terminal may be reproduced by the terminating terminal.

Consequently, when the data format supported the terminating terminal is different from the data format of an image to be sent, the data format of the image to be sent may be encoded within the mobile terminal 100 into the format supported by the terminating terminal.

A transmitting unit may send the format-converted image data to the terminating terminal (S250). The controller 180 may use DLNA or NFC for transmission of the image data.

When the data format supported by the terminating terminal is the same as the data format of the image to be sent, the transmitting unit may send the image data in a preset format to the terminating terminal (S250).

Embodiments may allow a designated second image to be output simultaneously on 2D and 3D screens, and a selected 2D or 3D image may be captured, stored, sent or shared. When a user input (multi-touch) is sensed during reproduction of a video, the controller 180 may pause the video reproduction and thereafter perform the capturing, storing, sending and sharing operations for the corresponding screen in response to a user input.

Embodiments may allow a 2D image to be converted for displaying into a 3D form based on a content having position information where 3D data is present.

In the mobile terminal, image data may be automatically converted in the mobile terminal into a data format suitable for a terminating terminal, thereby being sent to the terminating terminal. Therefore, the terminating terminal may immediately output the received image data without a conversion process of the data format.

Figure 9:
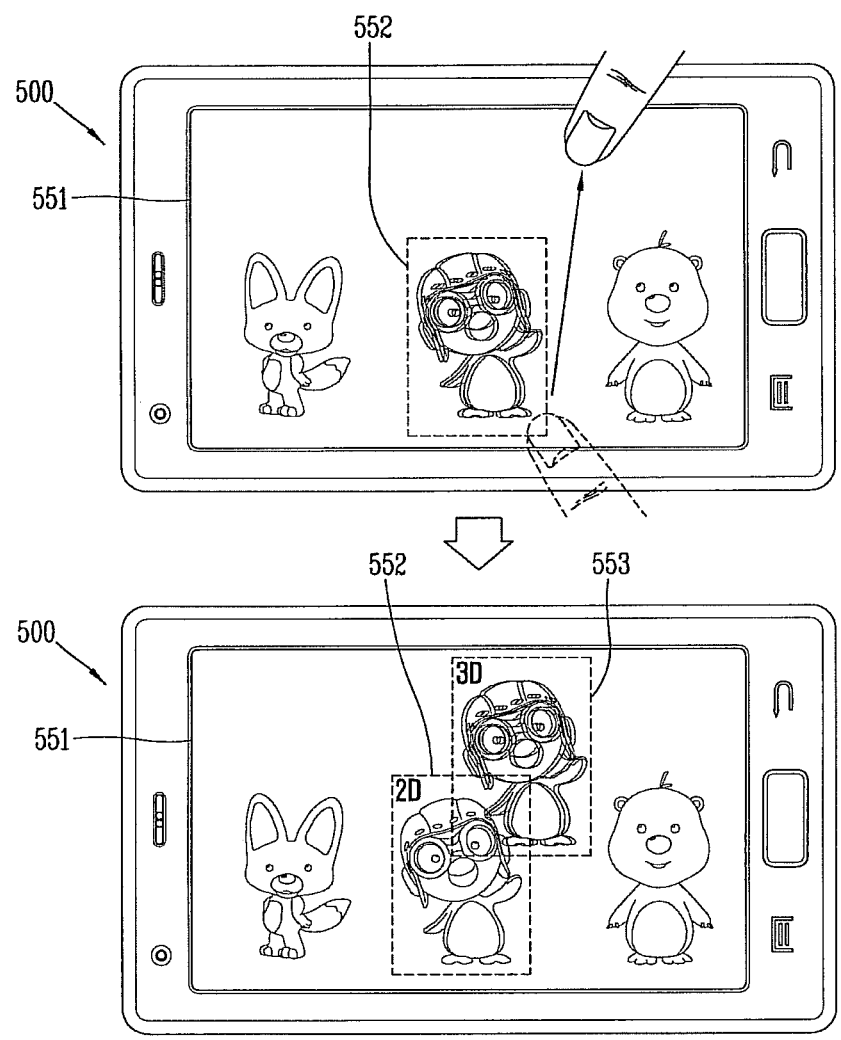
FIG. 9 is an overview showing another example of an image output by the mobile terminal according to the image converting method shown in FIG. 4.

FIG. 9 shows an example of moving a second image that is converted into a 3D form.

As shown in FIG. 9, with a specific area or a designated area 552 designated by a user's touch input, when a touch input is sensed on the designated area 552 for outputting a second image (hereinafter, referred to as first area) and another touch input is sensed on another designated area 553 for outputting a first image (hereinafter referred to as 'second area'), the second image may be moved to the second area to be output on the display 551.

The second image may be output in the same form or different forms on the first and second areas. Alternatively, the second image may be output only on the second area.

The touch inputs sensed on the first area and the second area may be input sequentially or simultaneously.

As described above, a partial area of a screen on which a predetermined stereoscopic type of image is output may be converted into another stereoscopic type of image for output. This may have an effect of outputting only a portion in which a user is interested in another format (2D→3D).

A partial area of a screen on which an image is output in a 2D form may be output in a 3D form. This may result in a reduction of a load and power consumption as compared to an entire screen being output in the 3D form.

The mobile terminal may send image data of a partial area, whose reproduction form has been converted, to another terminal such as TV or the like. Therefore, a user may view an image output on the terminal through a greater screen.

In the mobile terminal, image data may be sent to a terminating terminal by being automatically converted into a data format suitable for the terminating terminal. Therefore, the terminating terminal may effectively output the received image data immediately without a separate conversion process of the data format.

Further, in accordance with one embodiment, the method may be implemented as computer-readable codes in a program-recorded medium. The computer-readable medium may include all types of recording devices each storing data readable by a computer system. Examples of such computer-readable media may include ROM, RAM, CD-ROM, magnetic tape, floppy disk, optical data storage element and the like. The computer-readable medium may also be implemented as a format of carrier wave (e.g., transmission via an Internet). The computer may include the controller 180.

Another aspect of the detailed description may be to provide a variety of User Interfaces (UIs) for designating a part of a predetermined image and to convert the designated part into another type of image in response to a touch gesture.

An image converting method for a mobile terminal may include displaying a first image on a display unit, designating a partial area (or object) of the first image in response to a touch input, and outputting the designated partial area into a second image having a different stereoscopic type from the first image.

In designating the part of the first image, the second image may be designated by setting an area within the first image using the touch input.

Each of the first and second images may be output in a two-dimensional (2D) or in a three-dimensional (3D) form.

In converting into the different form, when the first image is output in the 3D form, the second image may be converted into a 3D form with a different depth from the first image.

In converting into the different form, the second image may be converted into an enlarged or reduced form in size.

The method may further include capturing or recording the second image when a capture command or a recording command is input, and sending image data corresponding to the captured still image or the recorded image to a terminating terminal.

The method may further include receiving, from the terminating terminal, data format information supported by the terminating terminal, converting a format of the image data based on the received information, and sending the format-converted image data to the terminating terminal.

The method may further include moving the second image to another position within the first image using a touch input.

The touch input may include at least one of a multi-touch, a drag and/or drop.

A mobile terminal may include a display unit configured to output a first image, and a controller configured to designate a partial area of the first image using a touch input sensed on the display unit and convert the designated area into a second image having a different stereoscopic type from the first image.

When one of the first and images is converted into a 2D form, the controller may convert the other image into a 3D form.

The controller may capture or record the second image when a capture command or a recording command is input, and send image data corresponding to the captured still image or the recorded image to a terminating terminal.

The controller may receive, from the terminating terminal, data format information supported by the terminating terminal, convert a format of the image data based on the received information, and send the format-converted image data to the terminating terminal.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An image displaying method of a mobile terminal comprising:

displaying, on a display, a first image having a first format, the first image including a plurality of objects;

designating, based on a touch input, an area from the first image displayed in the first format, the area including at least one of the plurality of objects;

converting, based on a touch type sensed on the designated area, the designated area into a second image having a second format different from the first format, automatically displaying, on the display based on the converted designated image, terminating devices to which the converted designated image is transmittable when a send function is selected, wherein the designated area is differently converted into the second image according to the sensed touch type, and wherein the terminating devices are displayed with a spaced distance and directionality around the converted designated image;

enlarging the designated area and simultaneously convert the enlarged designated area into the second image when the touch type is a double touch; and performing, based on an additional touch type sensed on the enlarged converted second image, related operations without selecting a menu, wherein the performing of the related operations includes:

changing a size of the enlarged converted second image into an original size and performing recording of the converted second image when the additional touch type is a double touch, performing capturing of the enlarged converted second image when the additional touch type is a single touch, and performing sending of the enlarged converted second image when the additional touch type is a multi-point touch.

2. The method of claim 1, wherein the first image displayed in the first format is a two-dimensional (2D) image, and the second image displayed in the second format is a perceived three-dimensional (3D) image.

3. The method of claim 1, wherein the designated area is converted into the second image when the touch input is a single touch, and the designated area is enlarged and simultaneously converted into the second image when the touch input is a double touch.

4. The method of claim 1, wherein the touch input is one of a multi-touch, a multi-drag or a drag and drop.

5. The method of claim 1, wherein the designated area converted into the second image is automatically adjusted in view of a depth based on an object included in the area.

6. The method of claim 1, further comprising converting, in response to a touch input, the second image to the original first image.

7. The method of claim 1, further comprising:

selectively converting, based on a touch position sensed on the designated area, the designated area or the object included in the designated area, where the at least one object of the designated area is converted into the second image when the touch position is a object, and the designated area is entirely converted into the second image when the touch position is an edge of the designated area.

8. The method of claim 1, further comprising:

automatically converting the entire first image into the second image when the designated area designated based on the touch input exceeds a predetermined reference area.

9. The method of claim 1, further comprising performing one of capturing, recording and sending the second image.

10. The method of claim 1, wherein a greatest depth is set when the designated area is converted from a three-dimensional (3D) form into a two-dimensional (2D) form, and different depths are set when a plurality of objects are designated at a time that the selected area is converted from the 2D form into the 3D form.

11. The method of claim 1, wherein the first image displayed in the first format is a perceived three-dimensional (3D) image, and the second image displayed in the second format is a two-dimensional (2D) image.

12. A mobile terminal comprising:

a display to display a first image having a first format, the first image including a plurality of objects; and a controller configured to:

designate, based on a touch input, an area from the first image displayed in the first format, the designated area including at least one of the plurality of objects, convert, based on a touch type sensed on the designated area, the designated area into a second image having a second format different from the first format, and automatically display, on the display based on the converted designated image, terminating devices to which the converted designated image is transmittable when a send function is selected, wherein the controller is configured to convert the designated area into the second image when the touch type is a single touch, and enlarge the designated area and simultaneously convert into the second image when the touch type is a double touch, and wherein the terminating devices are displayed with a spaced distance and directionality around the converted designated image, wherein the controller is configured to perform related operations without selecting a menu based on an additional touch type sensed on the enlarged converted second image, and wherein the controller is configured to:

change a size of the enlarged converted second image into an original size and perform recording of the converted second image when the additional touch type is a double touch, perform capturing of the enlarged converted second image when the additional touch type is a single touch, and perform sending of the enlarged converted second image when the additional touch type is a multi-point touch.

13. The mobile terminal of claim 12, wherein the first image displayed in the first format is a two-dimensional (2D) image, and the second image displayed in the second format is a perceived three-dimensional (3D) image.

14. The mobile terminal of claim 12, wherein the touch input is one of a multi-touch, a multi-drag or a drag and drop.

15. The mobile terminal of claim 12, further comprising:

a wireless communication unit to send the designated area converted into the second image to another electronic device.

16. The mobile terminal of claim 12, wherein the controller adjusts a depth of the designated area converted into the second image based on an object included in the corresponding area.

17. The mobile terminal of claim 12, wherein the controller restores the second image to the first image when another touch input is sensed.

18. The mobile terminal of claim 12, wherein the controller selectively converts, based on a touch position sensed on the designated area, the designated area or the object included in the designated area, and wherein the controller converts the at least one object of the designated area into the second image when the touch position is a object, and entirely converts the designated area into the second image when the touch position is an edge of the designated area.

19. The mobile terminal of claim 12, wherein the controller automatically converts the entire first image into the second image when the area designated by a touch input exceeds a predetermined reference area.

20. The mobile terminal of claim 12, wherein the controller performs one of capturing, recording and sending the second image, in response to a user input.

21. The mobile terminal of claim 12, wherein the first image displayed in the first format is a perceived three-dimensional (3D) image, and the second image displayed in the second format is a two-dimensional (2D) image.

* * * * *